UNITED STATES PATENT OFFICE.

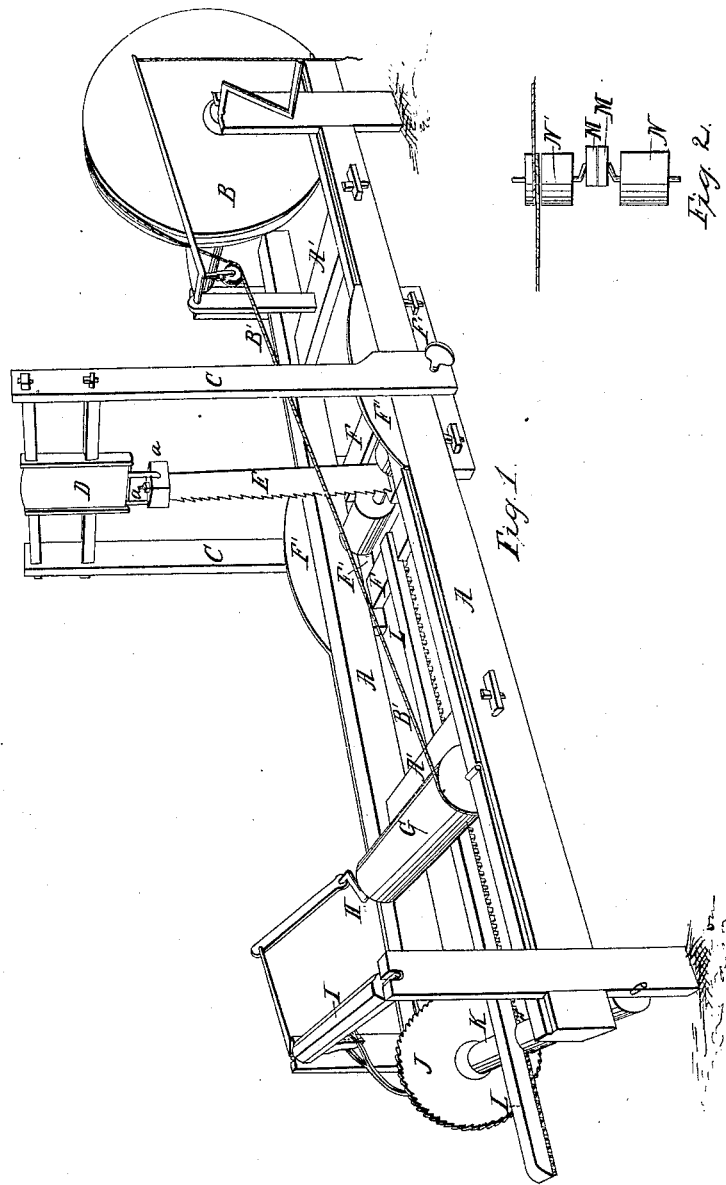

JAMES C. MAYO, OF COLUMBIA, VIRGINIA.

PORTABLE SAWMILL.

Specification of Letters Patent No. 2,202, dated July 29, 1841.

*To all whom it may concern:*

Be it known that I, JAMES C. MAYO, residing near Columbia Post-Office, in the county of Fluvanna and State of Virginia, have invented an Improvement in the Manner of Constructing Portable Sawmills for the Sawing of Timber; and I do hereby declare that the following is a full and exact description thereof.

In my saw-mill the log to be sawed is placed upon head and tail blocks, in the ordinary way, but the head and tail blocks do not rest upon a movable carriage, but upon the stationary longitudinal side pieces of the frame work of the mill; and the saw, instead of being strained in a frame which slides up and down between fender posts, is attached directly to a crank, or a horizontal shaft at its lower end, and to a sliding piece at its upper end, said saw not being strained in any way, but being kept straight by its own stiffness; the motion given to it by the crank relieving its teeth from the end of the kerf, as soon as the act of cutting is completed, and thus allowing it to rise with little friction.

In the accompanying drawing, I have not shown a log on the head and tail blocks upon which it is to rest, as there is not anything new in this part.

A, A, Figure 1 are the sides of the frame of the mill upon which the head and tail blocks are to be sustained, and which have the cross girths A', A', framed into them.

B, is a band wheel from which motion is to be communicated to the respective parts of the machinery; and it is to be considered as standing in the place of a horse-power, or other motive apparatus of any of the kinds applicable to the intended purpose.

C, C, are the upright, or cheek, pieces of the saw frame, and D, a slide to which the upper end of the saw E, is attached, so as to work upon the horizontal bend of the staple a, a, as a joint pin; or by the aid of any similar device which will allow the saw to vibrate by the motion of the crank at its lower end. The cheeks C, C, are attached to a sliding frame F, F, the parts F', F', of said sliding frame embracing the side pieces A, A, of the mill frame closely, but sliding freely along them. The gudgeons of the crank which actuates the saw have their bearings in this sliding frame.

G, is a roller which is made to revolve by the band B'; this roller carries a crank H, which rocks the shaft I, and effects the feeding by means of the rag wheel J, in the ordinary way. The shaft K, of the rag wheel carries a pinion which takes into the feed rack L, the inner end of which is attached to the sliding carriage F.

Fig. 2, is a top view of the crank which carries the saw. M, M, are two blocks which embrace the lower end of the saw, and within which the crank pin passes. N, N', are blocks through which the crank shaft passes, and which serve to stiffen it without its being necessary to use a great weight of iron; one of these, N', serves also as a wheel to receive the band B', of the driving wheel, by which motion is given to the crank and to the saw.

Having thus, fully described the manner in which I construct my portable saw mill, and also shown the operation thereof, what I claim therein as new, and desire to secure by Letters Patent, is—

1. The particular combination and arrangement of the respective parts thereof, as above set forth; that is to say, 2. I claim the above described manner of combining the saw with the sliding frame, the crank to which the lower end of the saw is attached having its bearings in said sliding frame; and the sliding frame being made to embrace the side pieces and being otherwise combined and arranged and actuated in the manner set forth. I am aware that a saw has been actuated directly by a crank at its lower end and has been actuated thereby, and that a saw has also been made to move up toward the log by means of a sliding frame; but these have not been used in combination with each other; and I therefore limit my claim to this combination, under the arrangements substantially as above described.

In testimony whereof I hereunto set my name this fourth day of June, 1841.

JAMES C. MAYO.

Witnesses:
THOS. P. JONES,
GEORGE WEST.